United States Patent [19]

O'Dougherty

[11] Patent Number: 5,526,605
[45] Date of Patent: Jun. 18, 1996

[54] SPRAY SHIELD

[75] Inventor: Michael D. O'Dougherty, Maplewood, Minn.

[73] Assignee: C.A.P., INC., Benson, Minn.

[21] Appl. No.: 353,922

[22] Filed: Dec. 12, 1994

Related U.S. Application Data

[63] Continuation of Ser. No. 133,604, Oct. 8, 1993, Pat. No. 5,371,969.

[51] Int. Cl.$^6$ .................................................. A01M 21/04
[52] U.S. Cl. ........................ 47/1.7; 248/221.12; 285/205; 285/209; 285/137.1
[58] Field of Search ...................................... 239/600, 288; 248/56, 222.1; 285/205, 206, 208, 209, 137.1; 47/1.7

[56] References Cited

U.S. PATENT DOCUMENTS

| | | | |
|---|---|---|---|
| 1,875,209 | 8/1932 | Baldwin | 285/205 |
| 2,566,886 | 9/1951 | Hartman | 248/56 |
| 2,697,862 | 12/1954 | Flora | 248/137.1 |
| 4,544,185 | 10/1985 | Weirich | 285/137.1 |
| 4,920,766 | 5/1990 | Yamamoto | 285/137.1 |
| 4,947,581 | 8/1990 | Claussen et al. | 47/1.7 |
| 5,155,933 | 10/1992 | Claussen et al. | 47/1.7 |
| 5,272,934 | 12/1993 | Chegash | 248/56 |

OTHER PUBLICATIONS

Copy of p. 61 of a Catalog entitled "94–95" Custom Ag Products, Inc., East Highway 12, Box 186, Benson MN 56215, illustrating Hose Shank Nozzle Bodies and Vari-S- pacing Clamps that are acknowledged to have been in public use and on sale well more than one year prior to Oct. 8, 1933, the priority date of the subject application.

*Primary Examiner*—Henry E. Raduazo
*Attorney, Agent, or Firm*—William L. Huebsch

[57] ABSTRACT

A polymeric spray shield assembly adapted to be connected to a support frame moved over plants growing in spaced rows from the earth and to be moved along the earth between the rows of plants while liquids such as herbicides not intended for contact with the plants in the rows are sprayed onto weeds between the rows of plants. The spray shield assembly comprises a polymeric spray shield having an inner surface defining a channel opening through an open side and front and rear ends of the spray shield, a top wall portion being adapted to have means attached thereto for suspending the spray shield from the support frame and through openings adapted to receive connector assemblies through which liquids are sprayed into the spray shield, and dependent opposite side wall portions. Stiff polymeric slotted end closure sheets are attached across the open front and rear ends of said channel to help retain the spray. Spaced weed knock down bars extend between the opposite side wall portions adjacent the open side of the channel and are adjustable to afford spacing the side wall portions at different distances.

12 Claims, 6 Drawing Sheets

SPRAY SHIELD

CROSS-REFERENCE TO RELATED APPLICATIONS

This application is a continuation of Ser. No. 08/133,604, filed Oct. 8, 1993 and now U.S. Pat. No. 5,371,969.

TECHNICAL FIELD

The present invention relates to spray shields used in spray shield assemblies adapted to be moved over or adjacent plants so as to temporarily enclose or protect them when liquids or agricultural chemicals are sprayed, thereby helping to insure that a high percentage of the sprayed liquids are deposited where they are intended to be sprayed rather than being blown away or onto adjacent plants.

BACKGROUND ART

Known are several spray shield assemblies adapted to be moved over plants being grown in rows in a field so as to temporarily enclose them when liquids or agricultural chemicals are sprayed onto the plants, thereby helping to insure that a high percentage of the sprayed liquids are deposited on or around the plants intended to be sprayed rather than being blown away or onto adjacent plants. Such spray shields have been sold by Ryan Manufacturing, Box 239, Newark, Ill. 60541 and Hiniker Company, P.O. Box 3407, Mankato, Minn. 56001, and are described in U.S. Pat. Nos. 4,947,581 and 5,155,933.

DISCLOSURE OF INVENTION

The present invention provides a simple and effective spray shield assembly that is adapted to be connected to a support frame moved over plants being grown in spaced rows from the earth and to be moved along the earth between the rows of plants while liquids such as herbicides (e.g., the herbicide commercially available as "Roundup" from Monsanto) not intended for contact with the plants in the rows are sprayed in a band onto weeds between the rows of plants over which the spray shield assembly passes.

The spray shield assembly according to the present invention comprises:

(1) a polymeric spray shield having an inner surface defining a channel opening through an open side and the front and rear axially spaced ends of the spray shield, which spray shield comprises (a) opposite axially extending side wall portions defining opposite portions of the inner surface; and (b) an axially extending top wall portion between the side wall portions defining the portion of the inner surface opposite the open side, the top wall portion being adapted to have means attached thereto for suspending the spray shield from the support frame and having through openings adapted to receive connector assemblies that position spray nozzles adjacent the inner surface of the top wall portion; (2) stiff polymeric end closure sheets across the open ends of the channel at the front and rear ends of the spray shield, the closure sheets including vertically extending side by side flap portions extending toward the open side of the channel; and (3) elongate knock down bars extending between and having opposite ends attached to the opposite side wall portions adjacent the open side of the channel in generally parallel axially spaced relationship, the knock down bars comprising means affording adjustment of their length within a predetermined range (e.g., plus or minus 2 inches with respect to the normal positions of the side wall portions) to afford spacing the side wall portions at different predetermined distances.

With this combination, weeds over which the spray shield assembly passes can be effectively sprayed with liquids such as herbicides, the sprayed liquid will be retained within the spray shield, large weeds and/or obstacles along the earth can, if necessary, move through the slotted end closure sheets, large weeds will be knocked down by the knock down bars so that they will be effectively coated by the sprayed liquid, and the width of the spray shield assembly can be adjusted within limits to an appropriate width to spray the majority of the weeds in a band between spaced rows of plants.

The top wall portion may have different through openings adapted to receive the connector assemblies and to position the spray nozzles in the connector assemblies at different attitudes that may be desired to spray different patterns to accommodate different widths between the side wall portions caused by adjusting the lengths of the knock down bars.

The spray shield can include a diverging front end portion with an outer surface adapted to lift and move crops around the sides of the spray shield.

The spray shield assembly may include skid members projecting past the edges of the side wall portions opposite the top wall portion that are adapted to slide along the earth over which the spray shield assembly is being moved to facilitate movement of the spray shield assembly between rows of plants.

Also, novel means are provided for attaching connector assemblies to the spray shield when the connector assemblies of a known type that hold spray nozzles and have rectangular four sided peripheries about their axes and radially outwardly projecting flanges positioned on opposite axially spaced sides of their rectangular periphery.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
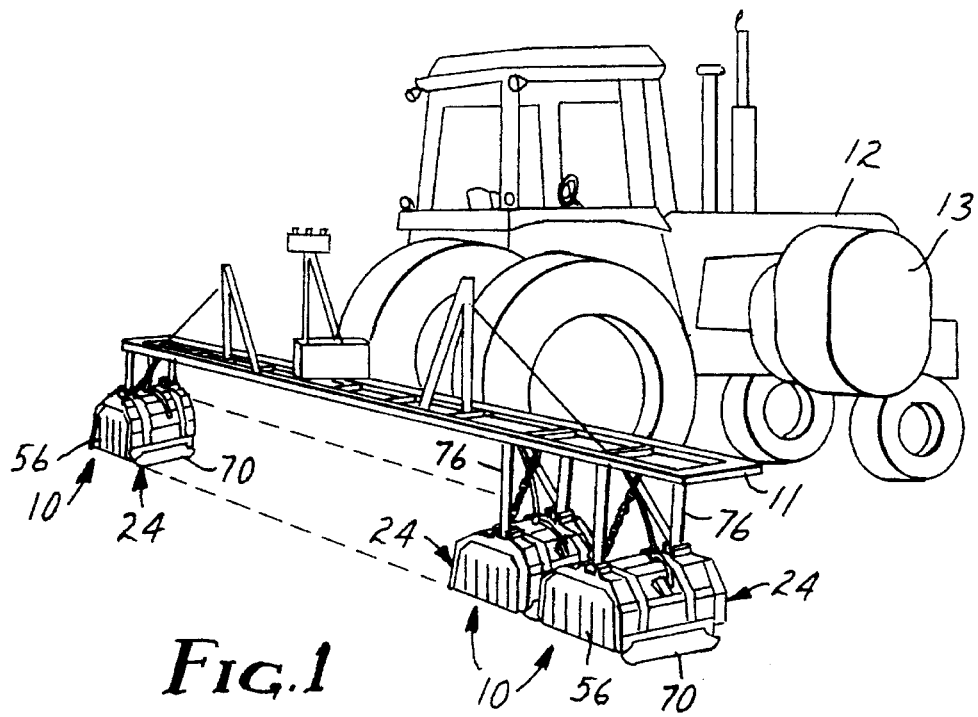
FIG. 1 is a perspective view of a plurality of spray shield assemblies according to the present invention shown attached to a frame mounted on a tractor.
Figure 2:
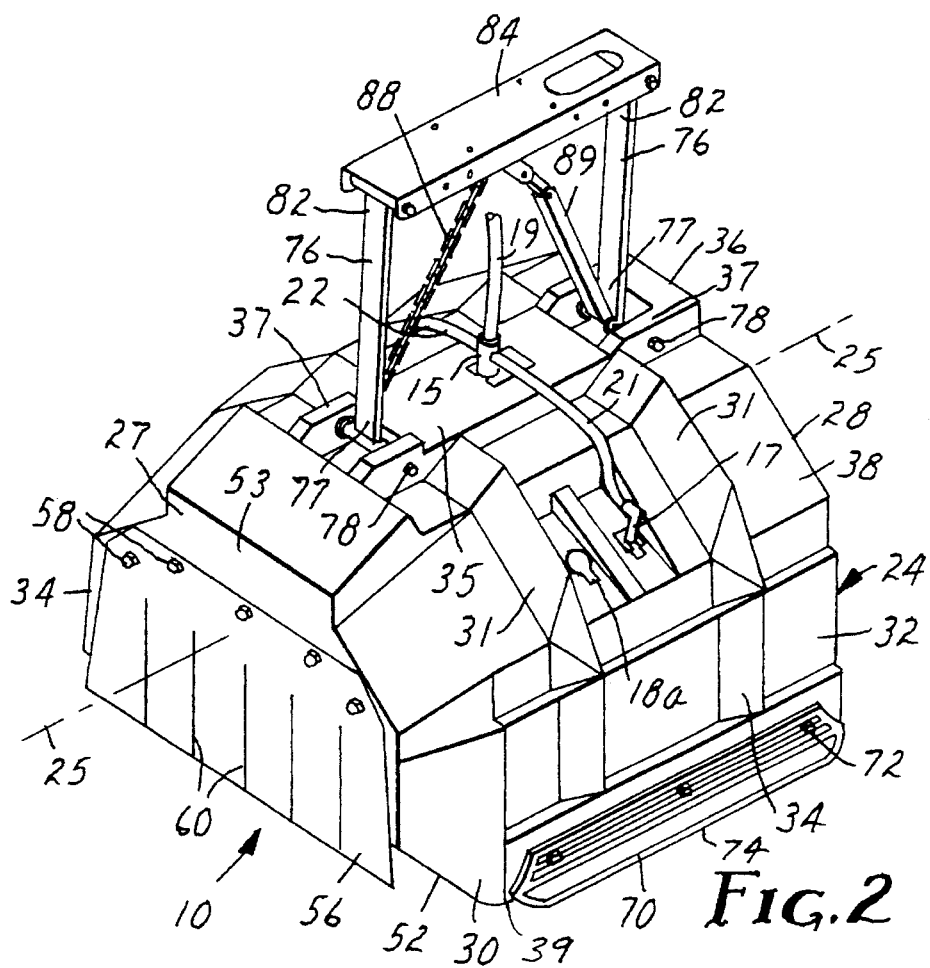
FIG. 2 is a perspective view of a first embodiment of a spray shield assembly according to the present invention, which is the embodiment of the spray shield assemblies illustrated in FIG. 1.
Figure 3:
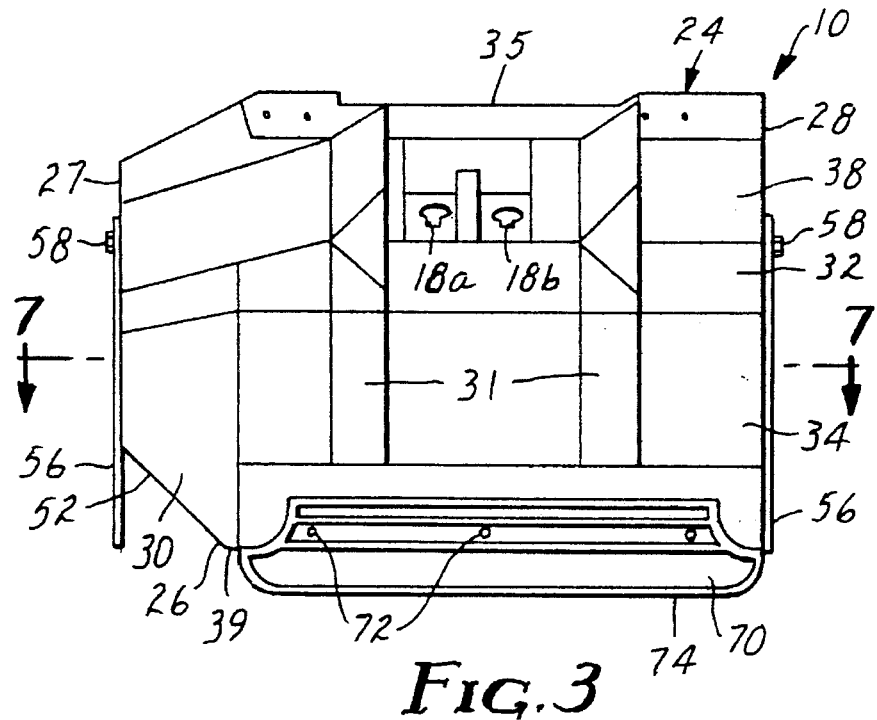
FIG. 3 is a side view of the spray shield assembly shown in FIG. 2 from which means for suspending the spray shield assembly and liquid distribution and spraying means have been removed.
Figure 4:
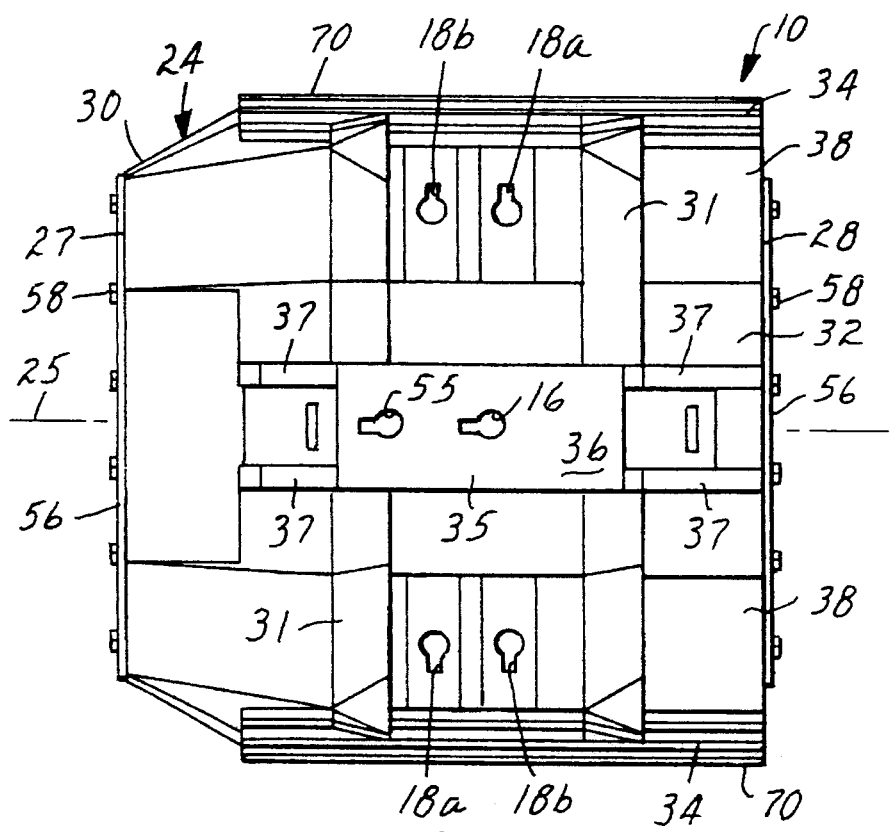
FIG. 4 is a top view of the spray shield assembly shown in FIG. 2 from which means for suspending the spray shield assembly and liquid distribution and spraying means have been removed.
Figure 5:
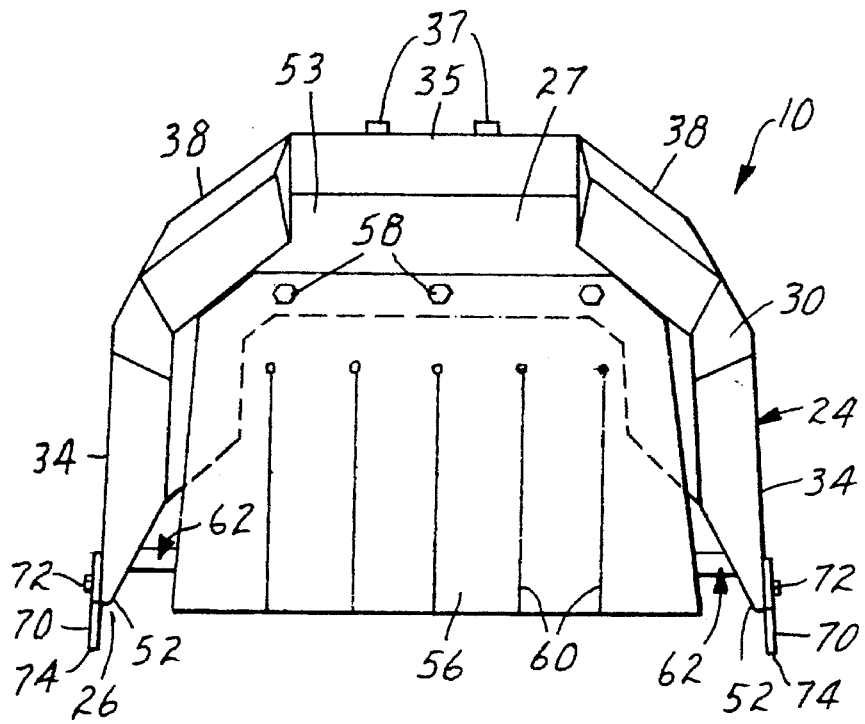
FIG. 5 is a front view of the spray shield assembly shown in FIG. 2 from which means for suspending the spray shield assembly and liquid distribution and spraying means have been removed.
Figure 6:
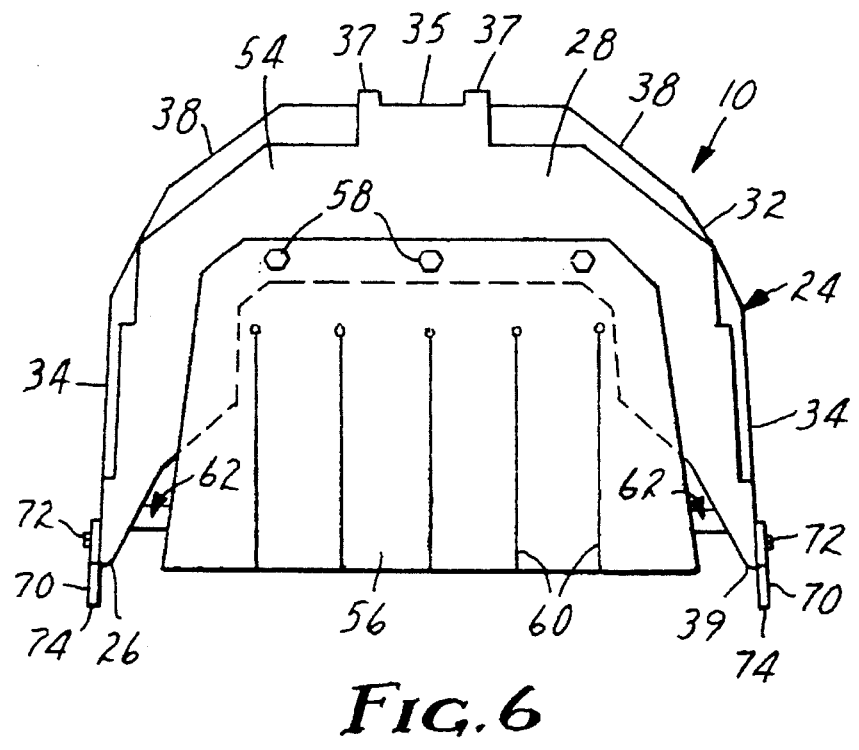
FIG. 6 is a rear view of the spray shield assembly shown in FIG. 2 from which means for suspending the spray shield assembly and liquid distribution and spraying means have been removed.
Figure 7:
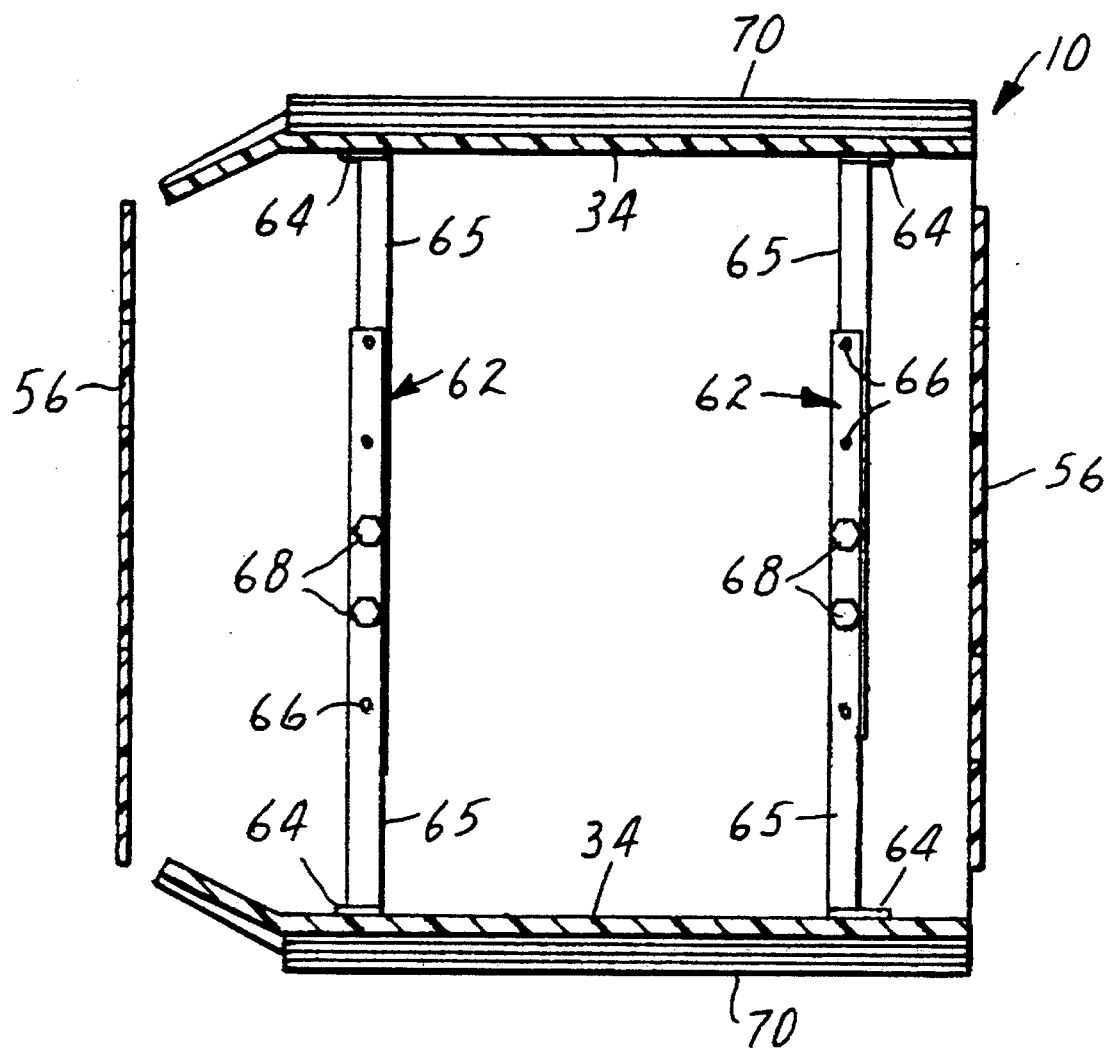
FIG. 7 is a sectional view taken approximately along lines 7—7 of FIG. 3.

Referring now to the drawing, there is shown in FIGS. 2 through 9 a spray shield assembly 10 according to the present invention which includes a spray shield 24. FIG. 1 shows a plurality of such spray shield assemblies 10 attached to a frame 11 mounted on a tractor 12 in parallel positions in which the spray shield assemblies 10 can be moved by the tractor 12 between rows of crops or plants being raised in field to temporarily enclose weeds between the rows of crops or plants while liquids such as herbicides are sprayed onto the weeds through the spray shield assemblies 10 by a pumping system 13 carried by the tractor 12.

The spray shield assembly 10 includes liquid distribution and spraying means including a hollow four way connector assembly 15 that has three projecting hose barbs and a projecting portion adapted to be fastened in a through opening 16 in a spray shield 24 by means later to be explained and to position a liquid outlet nozzle included in the connector assembly 15 inside the spray shield 24 (e.g., a nozzle of the type provided under the trademark "TeeJet" by Spraying Systems Co., Wheaton, Ill.). The liquid distribution and spraying means also includes two L-shaped connector assemblies 17 each having a hose barb and a projecting portion adapted to be fastened in one of two openings 18a or 18b in the spray shield 24 by means later to be explained and to position a liquid outlet nozzle included in each connector assembly 17 inside the spray shield 24, a hose 19 connecting the central hose barb on the connector assembly 15 to the pumping system 13 on the tractor 12, and two hoses 21 and 22 connected between hose barbs on the connector assembly 15 and the hose barbs on the L-shaped connector assemblies 17.

The spray shield 24 has a generally U-shaped cross section and is made of generally uniformly thick resiliently flexible polymeric material (e.g., made of about 0.21 inch thick polypropylene). The spray shield 24 is preferably made by spin or rotary molding to form two of the spray shields 24 together as a generally cylindrical part, and by then cutting the spray shields 24 from each other, but could also be made by injection molding. The spray shield 24 has an axis 25 and defines an axially extending channel opening through one open side 26 and front and rear axially spaced ends 27, 28 of the spray shield 24, in which channel the weeds are temporarily positioned as the spray shield 24 is moved over them.

The spray shield 24 includes a leading portion 30 that is generally U-shaped or semi-octagonal in cross section and diverges axially from adjacent the front end 27 toward the rear end 28 of the spray shield 24 (e.g., at an angle in the range of about twenty to forty degrees (e.g., about thirty degrees) with respect to the axis 25) so that its outer surface will, if necessary, help lift and direct portions of plants along adjacent rows away from the channel through the spray shield 24. The spray shield 24 also includes a generally U-shaped or semi-octagonal portion 32 extending from the end of the diverging leading portion 30 opposite the front end 27 of the spray shield 24 toward the rear end 28 of the spray shield 24. The generally semi-octagonal portion 32 has axially spaced circumferentially extending rib-like reinforcing portions 31 spaced along its length. The rib-like reinforcing portions 31 have V-shaped cross sections, with their leading outer surfaces being inclined at an angle so that they will help to lift and direct portions of plants along adjacent rows away from the hoses 19, 21 and 22 and the connector assemblies 15 and 17. The generally semi-octagonal portion 32 includes spaced opposite generally planar side wall portions 34 having opposed inner surfaces partially defining the inner surface of the spray shield 24; and a top wall portion 35 including an elongate axially extending generally planer central part 36 adapted, by having two recessed areas between side bosses 37, to have means (later to be explained) attached thereto for suspending the spray shield assembly 10 from the support frame 11 with the open side 26 of the channel adjacent the earth. The top wall portion 35 also includes flanking downwardly depending parts 38 between the central part 36 and the side wall portions 34. The spray shield 24 has spaced generally parallel bottom edges 39 along the side wall portions 34 that define the open side 26 of the channel.

The top wall portion 35 of the spray shield 24 also includes a plurality of generally planar anchor parts in which the through openings 16 or 18a or 18b are positioned. The anchor part in which the through opening 16 is positioned is generally central of the central part 36 of the top wall portion 35 and is disposed at a right angle to with respect to an imaginary plane containing the axis 25 of the spray shield 24 and bisecting the spray shield 24 by passing centrally through the top wall portion 35 and the open side of the spray shield 24. The anchor parts in which the through openings 18a or 18b are positioned are spaced axially along each of the flanking parts 38 of the top wall portion 35. Those anchor parts have different locations and orientations along the top wall portion 36 to afford positioning the connector assemblies 17 at different advantageous locations with respect to the open side 26 of the spray shield 24 to accommodate different widths between the side wall portions 34 caused by adjustable knock down bars 62 later to be explained. Each of the anchor parts has generally parallel inner and outer surfaces which can be engaged by the connector assembly 15 or 17 so that the axis of the nozzle in that connector assembly 15 or 17 is oriented at a right angle with respect to the surfaces of the anchor part.

The nozzle anchor parts are in two sets, one set having the through openings 16 and 18a and the other set having the through openings 16 and 18b, with one of the nozzle anchor parts in each set being on a different one of the opposite flanking parts 38 of the top wall portion 35, and one being along its central part 36. The through openings 18a and 18b in the nozzle anchor parts on the flanking parts 38 of the top wall portion 35 are spaced generally the same distance from opposite sides of the central part 36, and are spaced axially of the spray shield 24 on opposite sides of the through opening 16 in the anchor part on the central part 36 to restrict interference with liquid spray being discharged from the nozzles mounted in those anchor parts. The generally parallel inner and outer surfaces of the anchor parts having the openings 18a or 18b in each set are disposed generally at the same angle with respect to the imaginary plane containing the axis 25 of the spray shield 24 and bisecting the spray shield 24 by passing centrally through the top wall portion 35 and the open side of the spray shield 24.

Figure 8:
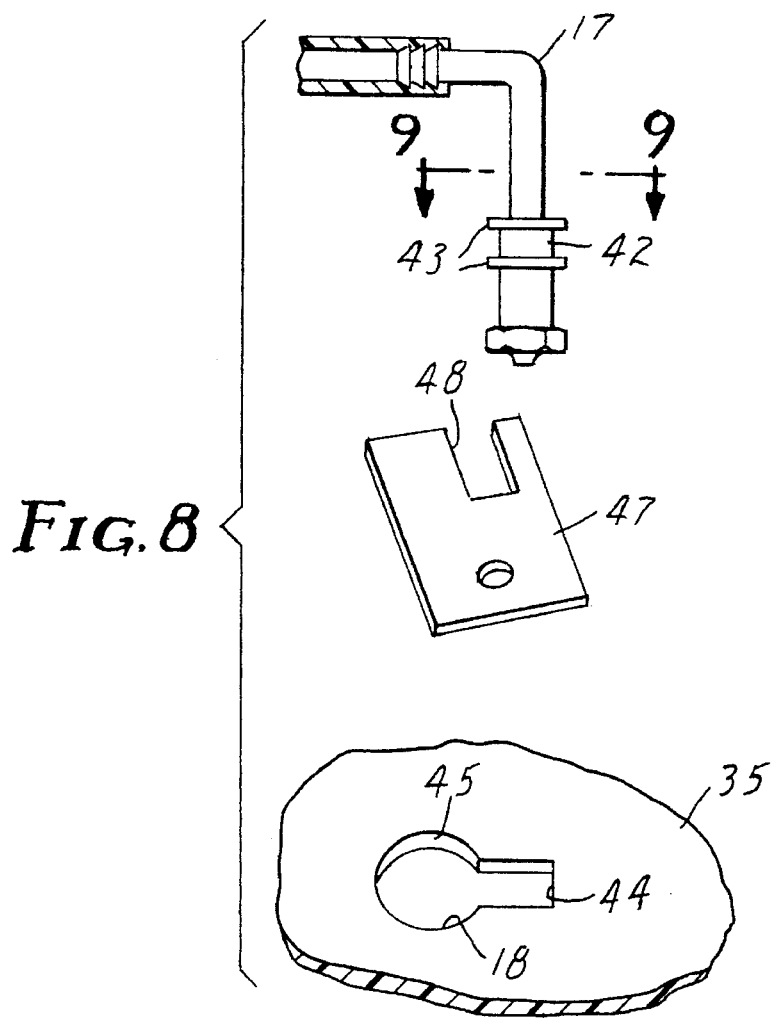
FIG. 8 is an exploded and enlarged fragmentary view of a connector assembly included in the spray shield assembly as shown in FIG. 2 and a portion of the spray shield to which it is attached.
Figure 9:
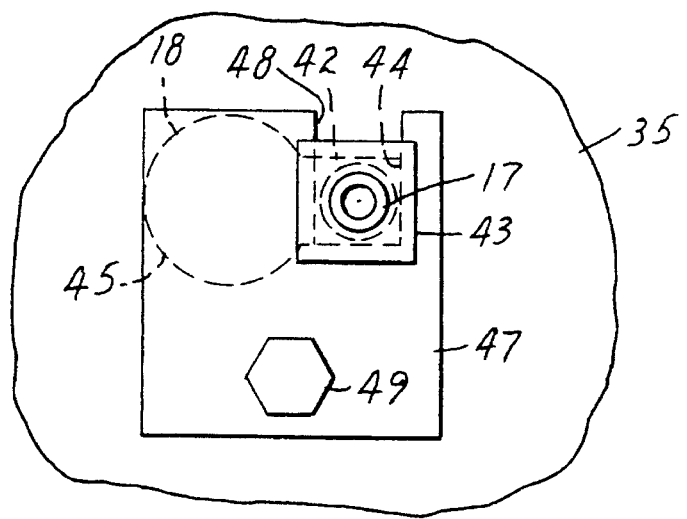
FIG. 9 is a fragmentary sectional view of the connector assembly shown in FIG. 8 taken approximately along the line 9—9 of FIG. 8 after the parts illustrated therein are assembled.

As can best be seen in FIGS. 8 and 9 that illustrate one of the connector assemblies 17 engaged with one of the through openings 18a or 18b, the connector assemblies 15 and 17 are of a known type (i.e., a connector assembly commercially designated "Quick Teejet Nozzle systems for Dry Booms" available from Spraying Systems Co., Wheaton, Ill.) having a rectangular four sided periphery 42 about the axis of the connector assembly 15 or 17 and spaced radially outwardly projecting flanges 43 having predetermined maximum peripheral dimensions, which flanges 43 are positioned on opposite axially spaced sides of the rectangular periphery 42. The through openings 16 and 18 each include a retaining portion 44 defined by three surfaces adapted to closely receive three of the four sides of the periphery 42 of the nozzle assembly 15 or 17 with the spaced flanges 43 of the nozzle assembly 15 or 17 adjacent the inner and outer surfaces of the anchor part in which the through opening 16 or 18 is formed. The through openings 16 and 18 also include a semi-circular entrance portion 45 larger in diameter than the periphery of the flanges 43 on the side of the retaining portion 44 not defined by the three surfaces. The entrance portion 45 affords axial movement of the rectangular periphery 42 of the connector assembly 15 or 17 into the through opening 16 or 18 to a position where it may be slid radially into the retaining portion 44 of the opening 16 or 18. The spray shield assembly 10 further includes an attachment plate 47 having a retaining edge surface 48 adapted to be positioned in a retaining position between one of the inner and outer surfaces of the anchor part (preferably the outer surface as illustrated) and the adjacent flange 43 of the connector assembly 15 or 17 when the connector assembly 15 or 17 is in the retaining portion 44 of the opening 16 or 18 with the retaining edge surface 48 of the attachment plate 47 in the retaining portion across the side of the retaining portion 44 not defined by the three surfaces. Means in the form of a bolt 49 is provided for releasably retaining the attachment plate 47 in its retaining position. Preferably, as illustrated, the attachment plate 47 has a slot opening through one edge defined by three surfaces including the retaining edge surface 48, which three surfaces are adapted to closely receive three of the four sides of the periphery 42 of the connector assembly 17, and has a portion adapted to cover the access portion 45 of the opening 16 or 18 when it is in its retaining position.

Nozzles can be mounted by the connector assemblies 15 or 17 in any one of the through openings 16 or 18a or 18b in the anchor parts to position the nozzles with their outlet ends projecting from the inner surface of the spray shield 24 to direct spray from the nozzles at desired orientations and locations relative to the edges 38 and thereby to plants within the spray shield 24. The spray pattern from each nozzle can further be adapted as desired to the type of plant or location on the plant at which the spray is to be directed by selecting nozzles that provide different spray angles or spray patterns such as a circular or fan like pattern, nozzles with such types of patterns being well known in the art and available from Spraying Systems Co., Wheaton, Ill.

The central part 36 of the top wall portion 35 also includes a through opening 55 in which a nozzle with a single inlet can be positioned should that be desired to provide only a single source of spray in the channel through the spray shield 24.

The diverging leading portion 30 of the spray shield 24 has edges or cam surfaces 52 extending from the lower edges 39 of the side wall portions 34 to the front end 27 of the spray shield 24 that will lift the spray shield 24 upon engagement of the cam surfaces 52 with an obstacle on the earth, thereby minimizing the impact on the spray shield 24 caused by such engagement.

The spray shield 24 has flanges 53 and 54 projecting radially inwardly at its front and rear ends 27 and 28 respectively, which flanges 45 and 46 with the rib-like reinforcing portions 31 spaced along its axis 25 restrict spreading of its opposite side wall portions 34 and thereby help retain the shape of the spray shield 24 and minimize vibration in the spray shield 24 when it is in use.

The spray shield assembly includes stiff polymeric end closure sheets 56 (e.g., of 0.6 inch thick polyethylene) across the open ends of the channel at the front and rear ends 27 and 28 of the spray shield 24. The closure sheets 56 each include continuous or un-slotted upper portions adjacent the top wall portion attached by a series of spaced bolt and washer attachment assemblies 58 to the axially inwardly projecting flanges 53 and 54 at the ends of the spray shield 24, and each have parallel slots 60 with radiused inner ends defining longitudinal side by side flap portions (e.g., each about 3 inches wide) extending from their upper portions toward the open side of the channel with the lower or distal ends of the flap portions slightly higher than, but generally aligned with the lower or distal edges 39 of the side wall portions 34 (e.g., 3 inches higher in front and 2 inches higher in the rear).

The spray shield assembly also includes elongate knock down bars 62 extending between opposite side wall portions 34 adjacent the open side of the channel in axially spaced generally parallel relationship. The knock down bars 62 have flanges 64 at their opposite ends attached by bolts to the opposite side wall portions 34 at positions slightly above the lower edges 39 of the side wall portions 34 (e.g., 4 inches above those lower edges 39). The knock down bars 62 comprise means affording adjustment of their lengths between their ends or flanges 64 within a predetermined range (e.g., at least 4 inches change in length) to afford spacing the lower edges 39 of the side wall portions 34 at different predetermined distances (e.g., plus or minus 2 inches with respect to their normal spacing distance), as may be appropriate for spraying different width areas or bands of weeds. As illustrated, the means affording adjustment of the lengths of the knock down bars 62 between their ends are provided by the elongate knock down bars 62 each include first and second overlaying portions 65 having L-shaped cross sections (e.g., the portions being of conventional angle iron) each having one of the flanges 64 attached thereto, the overlaying portions 65 having a series of spaced through openings 66 with certain of those openings being aligned when the end portions 65 overlay different distances, and the knock down bars 62 including nut and bolt attachment assemblies 68 extending through aligned ones of the openings and firmly attaching the overlaying portions 65 together.

Longitudinal skid members 70 are fastened along the outer sides of the side wall portions 34 by spaced nut and bolt attachment members 72 and have portions projecting past the distal edges 39 of the side wall portions 34. The portions of the skid members 70 projecting past the distal edges 39 of the side wall portions 34 have bottom surfaces 74 that are straight along their central portions and are radiused adjacent their front and rear ends, thereby adapting the skid members 70 to slide along the earth over which the spray shield assembly 10 is being moved.

Suspension means are also provided that are adapted for suspending the spray shield 24 from the frame 11. The suspension means comprises two rigid bars 76 having first ends 77. The first ends 77 of the bars 76 are mounted for pivotal movement about pivot axes defined by bolts 78 having U shaped heads that extend through the bars 76 and between the bosses 37 projecting from the top wall portion 35 adjacent its front and rear ends 27 and 28 respectively, which pivot axes are normal to the axis 25 of the spray shield 24 and are generally parallel to a plane defined by the lower edges 39 on the spray shield 24. Second ends 82 of the bars 76 opposite their first ends 77 are mounted by bolts or pins between the flanges of a U shaped channel 84 extending axially of the spray shield 24 and attached to the frame 11 for pivotal movement about axes defined by the pins or bolts through the ends 82 of the bars 76. Also included in the suspension means is a first resiliently elastic assembly 88 provided by a chain and coil spring that has one end fastened adjacent the pin through the first end 77 of the bar 76 adjacent the front end 27 of the spray shield 24 and an opposite second end attached to the channel 84 generally centrally between the second ends 82 of the bars; and a second resiliently elastic assembly 89 provided by an elastic rubber cord that has one end fastened adjacent the first end 77 of the bar 76 adjacent the rear end 28 of the spray shield 24 and an opposite second end attached to the channel 84 generally centrally between the second ends 82 of the bars, which cord 89 is stretched to provide tension between its points of attachment. The tensions applied in the resiliently elastic assemblies 88 and 89 are adapted so that the tension in the first resiliently elastic assembly 88 overcomes the tension in the second resiliently elastic assembly 89 and normally positions the bars 76 so that straight lines extending through the axes defined by the pins about which the ends 77 and 82 of the bars 76 pivot and intersecting the longitudinal axis 25 of the spray shield 24 will define an acute angle on the side of that intersection adjacent the front end 27 of the spray shield 24. (e.g., an acute angle of about 60 degrees) with the bottom surfaces 74 of the skid members 70 spaced about 1 inch from the earth. With that arrangement, engagement of the leading edges of the skid members or the cam edges 52 at the front end 27 of the spray shield 24 with an object or the ground will cause the spray shield 24 to move upward and rearward relative to the frame 11 against the bias normally provided by its weight and the second resiliently elastic assembly 89, after which the shield will again return to its normal position under the influence of its weight and the second resiliently elastic assembly 89.

As an example, the spray shield 24 adapted for use between crop rows separated by about 36 to 40 inches (e.g., cotton) can have an overall axial length of about 28 inches and a normal width between the outer surfaces of the opposite side wall portions 34 of about 28 inches which can be changed to a dimension between about 26 to 30 inches by adjusting the knock down bars 62; the anchor parts in the first set of nozzle anchor portions having the through openings 18a can have their inner and outer surfaces disposed parallel to the longitudinal axis 25 of the spray shield 24 and generally at an angle of about 70 degrees with respect to the imaginary spray shield bisecting plane 73 described above, with the centers of the through openings in the anchor parts spaced about 10.5 inches from the imaginary spray shield bisecting plane in opposite directions normal thereto so that the through openings 18a are useful to position the connector assemblies 18 to most effectively direct the spray from their nozzles when the side wall portions are positioned adjacent their minimum spacings by the knock down bars 62; and with the anchor parts in the second set of nozzle anchor portions having the through openings 18b can have their inner and outer surfaces disposed parallel to the longitudinal axis 25 of the spray shield 24 and generally at an angle of about 75 degrees with respect to the imaginary spray shield bisecting plane described above, with the centers of the through openings in the anchor parts also spaced about 10.5 inches from the imaginary spray shield bisecting plane pane in opposite directions normal thereto so that the through openings 18b are useful to position the connector assemblies 18 to most effectively direct the spray from their nozzles when the side wall portions are positioned adjacent their maximum spacings by the knock down bars 62.

Figure 10:
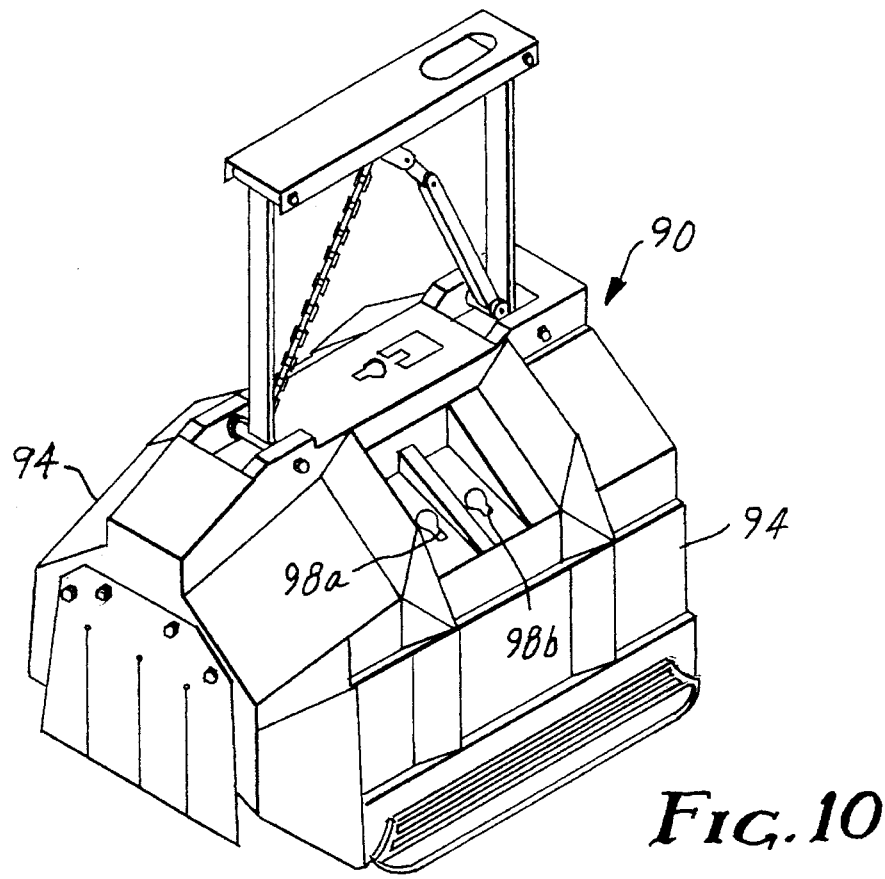
FIG. 10 is a perspective view of a second embodiment of a spray shield assembly according to the present invention.

As another example, if the spray shield assembly according to the present invention is adapted for use between crop rows separated by only about thirty inches (e.g., cotton) it can include a spray shield 90 having the slightly modified configuration illustrated in FIG. 10 and can have an overall axial length of about 28 inches and a normal width between the outer surfaces of its opposite side wall portions 94 of about 20 inches which can be changed to any dimension between about 18 to 22 inches by adjusting knock down bars in the assembly; the first set of anchor parts having the through openings 98a can have their inner and outer surfaces disposed parallel to the longitudinal axis of the spray shield 90 and generally at an angle of about 70 degrees with respect to the imaginary spray shield bisecting plane described above, with the centers of the through openings 98a in the anchor parts spaced about 6.5 inches from the imaginary spray shield bisecting plane in opposite directions normal thereto so that the through openings 98a are useful to position the connector assemblies 18 to most effectively direct the spray from their nozzles when the side wall portions 94 are positioned adjacent their minimum spacings by the knock down bars; and the anchor parts in the second set of nozzle anchor portions having the through openings 98b can have their inner and outer surfaces disposed parallel to the longitudinal axis 25 of the spray shield 24 and generally at an angle of about 75 degrees with respect to the imaginary spray shield bisecting plane described above, with the centers of the through openings 98b in the anchor parts also spaced about 6.5 inches from the imaginary spray shield bisecting plane pane in opposite directions normal thereto so that the trough openings 98b are useful to position the connector assemblies 18 to most effectively direct the spray from their nozzles when the side wall portions 94 are positioned adjacent their maximum spacings by the knock down bars.

Figure 11:
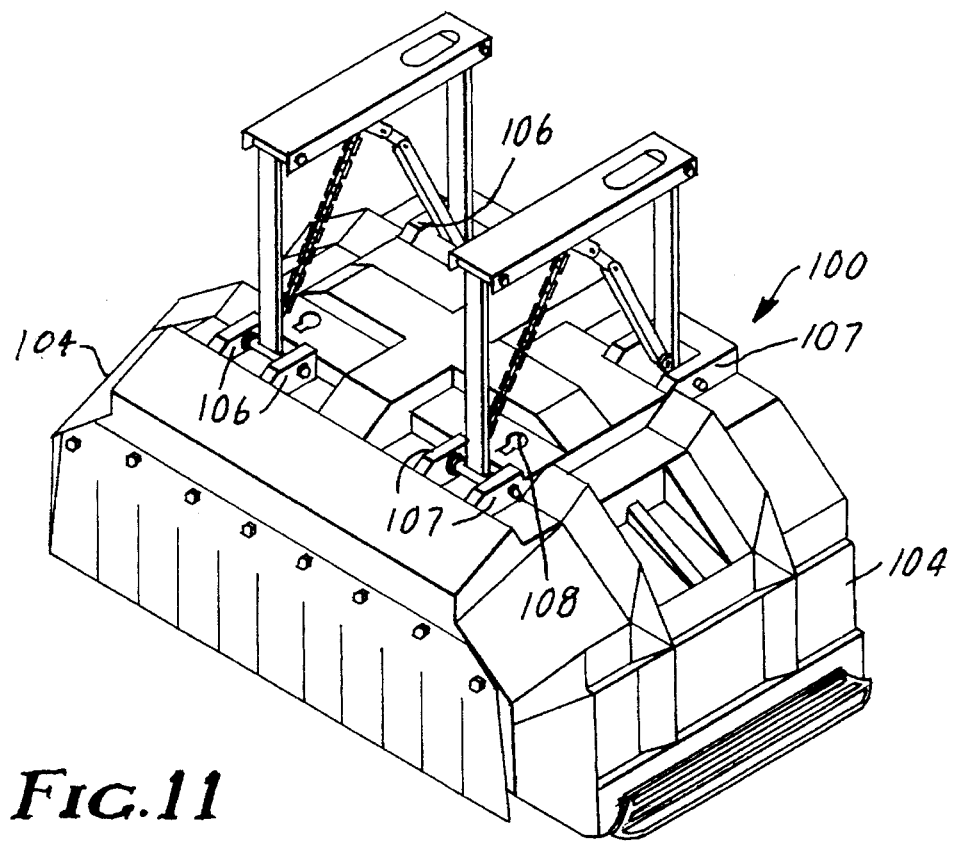
FIG. 11 is a perspective view of a third embodiment of a spray shield assembly according to the present invention.

As yet another example, if the spray shield assembly according to the present invention is adapted for use between crop rows separated by about 72 inches (e.g., sugar cane) it can include a spray shield 100 having the modified configuration illustrated in FIG. 11 and can have an overall axial length of about 28 inches and a normal width between the outer surfaces of its opposite side wall portions 104 of about 46 inches which can be changed to any dimension between about 44 to 48 inches by adjusting knock down bars in the assembly. Because of its width, the spray shield 100 has two pairs of bosses 106 and 107, and means of the type described above may be attached to each pair of bosses 106 and 107 for suspending the spray shield 100 from the frame 11. Also, the spray shield has only the two trough openings 108. The anchor parts having the through openings 108 can have their inner and outer surfaces disposed parallel to the longitudinal axis 25 of the spray shield 100 and generally at an angle of about 90 degrees with respect to the imaginary spray shield bisecting plane described above, with the centers of the through openings 108 in the anchor parts spaced about 12 inches from the imaginary spray shield bisecting plane in opposite directions normal thereto so that the through openings 108 are useful to position the connector assemblies 16 or 18 to effectively direct the spray from their nozzles when the side wall portions 104 are positioned anywhere between their minimum and maximum spacings by the knock down bars.

The present invention has now been described with reference to three embodiments thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

I claim:

1. A spray shield assembly comprising a spray shield having an outer surface and an opposite inner surface defining a channel opening through an open side of the spray shield, said spray shield comprising an anchor part having a through opening adapted to receive a connector assembly of the known type having a rectangular four sided periphery about the axis of the connector assembly and spaced radially outwardly projecting flanges having predetermined maximum peripheral dimensions, said flanges being positioned on opposite axially spaced sides of said rectangular periphery; said through opening including a retaining portion defined by three retaining surfaces extending between said inner and outer surfaces adapted to closely receive three of the four sides of the periphery of the connector assembly with the spaced flanges of the nozzle assembly adjacent the inner and outer surfaces of the anchor part, and an entrance portion larger than the periphery of the flanges on the side of the retaining portion not defined by said three surfaces, said entrance portion affording axial movement of the rectangular periphery of the connector assembly into said entrance portion to a position where said connector assembly may be slid radially into the retaining portion of the opening; and said spray shield assembly further including an attachment plate having a retaining edge surface adapted to be positioned in a retaining position between one of the inner and outer surfaces of the anchor part and the adjacent flange of the nozzle assembly when the nozzle assembly is in the retaining portion of the opening with said retaining edge surface of the attachment plate across the side of the retaining portion not defined by said three retaining surfaces in the retaining portion; and means for releasably retaining said attachment plate in said retaining position.

2. A spray shield assembly according to claim 1 wherein said nozzle attachment plate has a slot opening through one edge defined by three edge surfaces including said retaining edge surface, said three edge surfaces being adapted to closely receive three of the four sides of the periphery of the nozzle assembly, and said nozzle attachment plate has a portion that overlays said entrance portion when said attachment plate is in said retaining position.

3. A spray shield assembly comprising a spray shield having an outer surface and having an opposite inner surface defining a channel opening through an open side of the spray shield, said spray shield comprising an anchor part having a through opening between said surfaces adapted to receive a connector assembly of the known type having a rectangular four sided periphery about the axis of the connector assembly and spaced radially outwardly projecting flanges having predetermined maximum peripheral dimensions, said flanges being positioned on opposite axially spaced sides of said rectangular periphery; said through opening including a retaining portion defined by three retaining surfaces extending between said inner and outer surfaces of said spray shield, which retaining surfaces are adapted to closely receive three of the four sides of the periphery of the connector assembly with the spaced flanges of the nozzle assembly adjacent the inner and outer surfaces of the anchor part, and an entrance portion larger than the periphery of the flanges on the side of the retaining portion not defined by said three retaining surfaces, said entrance portion affording axial movement of the rectangular periphery of the connector assembly into said entrance portion to a position where the connector assembly may be slid radially into the retaining portion of the opening; and said spray shield assembly further including an attachment plate having a retaining edge surface adapted to be positioned in a retaining position relative to said anchor part with said retaining edge surface of the attachment plate across the side of the retaining portion not defined by said three retaining surfaces; and means for releasably retaining said attachment plate in said retaining position.

4. A spray shield assembly according to claim 3 wherein in said retaining position said attachment plate is positioned between one of the inner and outer surfaces of the anchor part and the adjacent flange of the nozzle assembly when the nozzle assembly is in the retaining portion of the opening.

5. A spray shield assembly according to claim 4 wherein said nozzle attachment plate has a slot opening through one edge defined by three edge surfaces including said retaining edge surface, said three edge surfaces being adapted to closely receive three of the four sides of the periphery of the nozzle assembly.

6. A spray shield assembly according to claim 3 wherein said nozzle attachment plate has a portion that overlays said entire entrance portion when said attachment plate is in said retaining position.

7. A spray shield assembly according to claim 3 wherein in said retaining position said attachment plate is positioned between the outer surface of the anchor part and the adjacent flange of the nozzle assembly when the nozzle assembly is in the retaining portion of the opening.

8. In combination:

a connector assembly of the known type having a rectangular four sided periphery about the axis of the connector assembly and spaced radially outwardly projecting flanges having predetermined maximum peripheral dimensions, said flanges being positioned on opposite axially spaced sides of said rectangular periphery;

a spray shield assembly comprising a spray shield having an outer surface and having an opposite inner surface defining a channel opening through an open side of the spray shield, said spray shield comprising an anchor part having a through opening between said surfaces adapted to receive said connector assembly, said through opening including a retaining portion defined by three retaining surfaces extending between said inner and outer surfaces of said spray shield, which retaining surfaces closely receive three of the four sides of the periphery of the connector assembly with the spaced flanges of the nozzle assembly adjacent the inner and outer surfaces of the anchor part, and an entrance portion larger than the periphery of the flanges on the side of the retaining portion not defined by said three retaining surfaces, said entrance portion affording axial movement of the rectangular periphery of the connector assembly into said entrance portion to a position where the connector assembly may be slid radially into the retaining portion of the opening; and said spray shield assembly further including an attachment plate having a retaining edge surface positioned in a retaining position relative to said anchor part with said retaining edge surface of the attachment plate across the side of the retaining portion not defined by said three retaining surfaces; and means for releasably retaining said attachment plate in said retaining position.

9. A combination according to claim 8 wherein in said retaining position said attachment plate is positioned between one of the inner and outer surfaces of the anchor part and the adjacent flange of the nozzle assembly.

10. A combination according to claim 9 wherein said nozzle attachment plate has a slot opening through one edge defined by three edge surfaces including said retaining edge surface, said three edge surfaces closely receiving three of the four sides of the periphery of the nozzle assembly.

11. A combination according to claim 8 wherein said nozzle attachment plate has a portion overlaying said entire entrance portion.

12. A combination according to claim 8 wherein said attachment plate is positioned between the outer surface of the anchor part and the adjacent flange of the nozzle assembly.

* * * * *